United States Patent
Audry et al.

(10) Patent No.: US 6,274,270 B1
(45) Date of Patent: Aug. 14, 2001

(54) NON-SINTERED NICKEL ELECTRODE FOR AN ALKALINE ELECTROLYTE SECONDARY ELECTROCHEMICAL CELL

(75) Inventors: Claudette Audry, Bruges; Michelle Baudry, Merignac; Patrick Bernard; Olivier Jan, both of Bordeaux, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/481,539

(22) Filed: Jan. 12, 2000

(30) Foreign Application Priority Data

Jan. 21, 1999 (FR) .................................................. 99 00618

(51) Int. Cl.⁷ ...................................................... H01M 4/32
(52) U.S. Cl. ........................... 429/223; 429/232; 429/233
(58) Field of Search ................................ 429/223, 231.1, 429/231.9, 232, 233

(56) References Cited

U.S. PATENT DOCUMENTS

| | | | |
|---|---|---|---|
| 4,943,497 | * | 7/1990 | Oishi et al. ............................ 429/53 |
| 5,409,786 | * | 4/1995 | Bailey ................................. 429/221 |
| 5,672,447 | | 9/1997 | Yamawaki et al. .................. 429/223 |
| 6,017,655 | * | 1/2000 | Ovshinsky et al. .................. 429/223 |
| 6,045,771 | * | 4/2000 | Matsubara et al. ............... 429/231.1 |
| 6,114,063 | * | 9/2000 | Katsumoto et al. ................ 429/223 |

FOREIGN PATENT DOCUMENTS

| | | |
|---|---|---|
| 0 866 510 A2 | 9/1998 | (EP) . |
| 10 326 616 | 12/1998 | (JP) . |

* cited by examiner

Primary Examiner—Laura Weiner
(74) Attorney, Agent, or Firm—Sughrue, Mion, Zinn, Macpeak & Seas, PLLC

(57) ABSTRACT

A non-sintered nickel electrode for alkaline electrolyte storage cells including a current collector and a paste containing an active material based on nickel hydroxide and a conductive material, wherein said conductive material is a lithium-containing cobalt and nickel oxide whose degree of oxidation obtained after electrochemical conditioning is stable after prolonged storage in the alkaline electrolyte.

15 Claims, No Drawings

NON-SINTERED NICKEL ELECTRODE FOR AN ALKALINE ELECTROLYTE SECONDARY ELECTROCHEMICAL CELL

The present invention relates to a non-sintered nickel electrode as used in particular as the positive electrode in an alkaline electrolyte secondary electro-chemical cell, for example nickel-cadmium, nickel-iron, nickel-hydrogen, or nickel-hydridable metal storage cells, and to a cell containing such an electrode. The method further relates to a method of preparing the electrode.

BACKGROUND OF THE INVENTION

Many types of electrode can be used in an alkaline electrolyte storage cell, such as sintered electrodes and non-sintered electrodes, also referred to as paste electrodes or plasticized electrodes. Compared to other types of electrode, a non-sintered electrode contains a greater quantity of material and its capacity per unit volume is therefore increased while its manufacturing cost is reduced.

A non-sintered nickel electrode includes a support serving as a current collector coated with a paste containing both the active material and a binder, to which paste a conductive material is usually added. Said support is a porous three-dimensional conductive support such as felt or foam based on metal or carbon; it can also be a two-dimensional conductive support such as expanded metal, mesh, woven fabric, or solid or perforated strip. While the electrode is being manufactured, a volatile solvent is added to the paste to adjust its viscosity to facilitate shaping it. When the paste has been deposited on or in the support, the result is compressed and dried to obtain an electrode of the required density and thickness.

In a non-sintered nickel electrode, the active material is a nickel-based hydroxide. Nickel hydroxide is a poor conductor and requires a material enabling good electrical percolation to be added to the electrode. The paste therefore generally contains a conductive material, for example a cobalt compound such as metallic cobalt Co, cobalt hydroxide $Co(OH)_2$, and/or cobalt oxide CoO. The first time the alkaline storage cell is charged, these compounds are oxidized to form cobalt oxyhydroxide CoOOH in which the degree of oxidation of the cobalt is greater than or equal to +3. Cobalt oxyhydroxide is stable in the normal range of operation of the nickel positive electrode and is insoluble in the alkaline electrolyte. It provides the electrical percolation of the electrode.

If an alkaline storage cell having a non-sintered nickel-positive electrode is stored in a completely discharged state, its voltage decreases with time. If the battery is stored for more than a few months, its voltage tends to 0 V. Under those conditions, the cobalt oxyhydroxide is slowly reduced. The degree of oxidation of the cobalt initially falls to +2.66 ($Co_3O_4$) and then to +2 ($Co(OH)_2$).

Cobalt hydroxide $Co(OH)_2$ is highly soluble in the electrolyte. After several months in storage there is therefore a loss of conductivity due to partial dissolution of the percolating structure of the non-sintered electrode. This causes an irreversible loss of capacity, which can exceed 15%, and which occurs regardless of the cobalt compound in the paste.

European Patent Application EP-A-0 798 801 and U.S. Pat. No. 5,672,447 propose the use of nickel hydroxide powder coated with a disordered cobalt compound having a valency greater than +2. European Patent Application EP-A-0 789 408 specifies a cobalt compound of that kind containing from 0.1% to 10% by weight sodium. Such coatings are likewise not stable during storage at a low voltage.

OBJECT AND SUMMARY OF THE INVENTION

The object of the present invention is to propose a non-sintered nickel electrode in which irreversible loss of capacity in storage is greatly reduced compared to prior are electrodes.

The present invention consists in a non-sintered nickel electrode for alkaline electrolyte storage cells including a current collector and a paste containing an active material based on nickel hydroxide and a conductive material, wherein said conductive material is a lithium-containing cobalt and nickel oxide whose degree of oxidation obtained after electrochemical conditioning is stable after prolonged storage in the alkaline electrolyte.

The rate of reduction of the lithium-containing oxide in accordance with the invention is much lower than that of a standard prior art substance having a degree of oxidation of +3 after electrochemical conditioning. Consequently, for the same storage period, the irreversible loss of capacity is very greatly reduced compared to that observed in prior art cells.

For the positive electrode to have an optimum utilization ratio, the conductivity of said conductive material after electrochemical conditioning is greater than $10^{-2}$ $Siemens.cm^{-1}$.

In a preferred embodiment of the invention said lithium-containing oxide has the formula $Li_xNi_yCo_{1-y}O_2$ with x in the range from 0.1 to 1 and y in the range from 0.02 to 0.9.

In a first variant said lithium-containing oxide is in the form of powder mixed with the nickel hydroxide powder and the grains of said lithium-containing oxide powder have a mean particle size less than 0.7 $\mu$m and preferably less that 0.5 $\mu$m; the quantity of said lithium-containing oxide in the form of powder relative to said active material is preferably in the range from 6% to 12% by weight.

In a second variant said lithium-containing oxide coats the nickel hydroxide grains; the quantity of said lithium-containing oxide relative to said active material is then preferably in the range from 3% to 9% by weight.

In a third variant said lithium-containing oxide is both in the form of powder mixed with the nickel hydroxide powder and in the form of a coating on the nickel hydroxide grains.

In another embodiment of the invention said lithium-containing oxide has the formula $Li_xNa_zNi_yCo_{1-y}O_2$ with x+z in the range from 0.1 to 1 and z in the range from 0 to 0.5.

In the foregoing description, the expression "nickel hydroxide" means a hydroxide containing principally nickel and also at least one syncrystallized hydroxide of an element chosen from zinc, cadmium, magnesium, and aluminum; it can also contain at least one syn-crystallized hydroxide of an element chosen from cobalt, manganese, yttrium, calcium, and zirconium.

Said electrode support is advantageously nickel foam.

The paste containing the active material also includes a first binder based on polytetrafluoroethylene (PTFE) and a second binder chosen from carboxymethyl cellulose (CMC), hydroxypropylmethyl cellulose (HPMC), hydroxyethyl cellulose (HEC), hydroxypropyl cellulose (HPC), polyvinylidene fluoride (PVDF) and styrene buta-diene rubber (SBR).

DETAILED DESCRIPTION OF THE INVENTION

Other features and advantages of the present invention will become apparent on reading the following description of embodiments of the invention which is given by way of illustrative and non-limiting example only.

EXAMPLE 1 (comparative)

1i) Standard cobalt hydroxide Co(OH)$_2$ was prepared in the following manner.

0.5 liter of a 1M aqueous solution of cobalt sulfate was introduced into a precipitation reactor maintained at a constant temperature of 50° C. Synthesis was performed in an inert atmosphere with the aim of preventing all contact with oxygen in order to reduce the risk of oxidation of the cobalt hydroxide to be produced. 650 g of 2M sodium hydroxide solution was added continuously and at a constant flowrate for 30 minutes. On completion of the addition of the sodium hydroxide, the solution was constantly stirred and heated for 2 hours to allow the hydroxide particles to mature. The precipitate obtained was then filtered and washed with distilled water at room temperature in an inert atmosphere. The substance obtained was then dried in a vacuum for 24 hours at a temperature of 70° C., after flooding the oven with inert gas. The precipitate obtained was then ground in an inert atmosphere to the appropriate particle size range.

1ii) "Test" cobalt electrodes "a" were made using the above cobalt hydroxide powder in the form of a paste whose composition expressed as a percentage by weight relative to the weight of the paste was approximately as follows:

cobalt hydroxide powder: 22%,
water: 76.2%,
CMC: 0.3%,
PTFE: 1.5%.

The resulting paste was introduced into nickel foam having a porosity of approximately 95%. The result was dried and then rolled to obtain the electrodes "a".

1iii) Cobalt-cadmium Co—Cd storage cells were assembled incorporating the electrodes "a". Each positive electrode was placed in contact with two super-capacitive cadmium negative electrodes. The positive and negative electrodes were separated by a layer of non-woven polypropylene. The assembly was then impregnated with an alkaline electrolyte in the form of an aqueous solution of 7.4N potassium hydroxide KOH, 0.5N lithium hydroxide LiOH and 0.4N sodium hydroxide NaOH. Storage cells Aa were obtained.

EXAMPLE 2 (comparative)

2i) Standard cobalt oxide CoO was used.

2ii) "Test" cobalt electrodes "b" were made as in example 1ii) using a paste whose composition expressed as a percentage by weight relative to the weight of the paste was approximately as follows:

cobalt oxide powder: 45%,
water: 53.2%,
CMC: 0.3%,
PTFE: 1.5%.

2iii) Cobalt-cadmium Co—Cd storage cells including the electrodes "b" were assembled in the same manner as in example 1iii). Storage cells Ab were obtained.

EXAMPLE 3

3i) Cobalt hydroxide powder containing 10% nickel hydroxide was prepared by the method described in example ii) using a mixture of a solution of 0.98M cobalt sulfate and 0.02M nickel sulfate. A mixed hydroxide of formula Ni$_{0.02}$Co$_{0.98}$(OH)$_2$ was obtained. The mixed hydroxide was taken up in suspension in a solution containing excess 48° sodium hypochlorite solution for 2 hours at 20° C. The result was washed with deionized water and dried at 70° C. The substance obtained was a mixed oxyhydroxide of formula Ni$_{0.02}$Co$_{0.98}$OOH. The mixed oxyhydroxide was then taken up in suspension in a 5M LiOH solution at 90° C. for 72 hours. The result was washed with deionized water and dried at 70° C. The substance obtained was a lithium-containing nickel oxide of formula Li$_x$Ni$_{0.02}$Co$_{0.98}$O$_2$. Spectroscopic analysis showed that x was equal to 1; the diameter of the substance obtained, as measured by laser granulometry, was 0.3 μm.

3ii) "Test" electrodes "c" were made with the above powder as in example 1ii) using a paste whose composition expressed as a percentage by weight relative to the weight of the paste was approximately as follows:

lithium-containing nickel and cobalt oxide powder: 22%,
water: 76.2%,
CMC: 0.3%,
PTFE: 1.5%.

3iii) Storage cells including the electrodes "c" were assembled as in example 1iii). Storage cells Ac were obtained.

EXAMPLE 4

4i) Nickel hydroxide powder containing 50% cobalt hydroxide was prepared by the method described in example 1i) using a mixture of a solution of 0.5M cobalt sulfate and 0.5M nickel sulfate. A mixed hydroxide was obtained of formula Ni$_{0.5}$Co$_{0.5}$(OH)$_2$. The mixed hydroxide was taken up in suspension in a solution containing excess 48° sodium hypochlorite solution for 2 hours at 20° C. The result was washed with deionized water and dried at 70° C. The substance obtained was a mixed oxyhydroxide of formula Ni$_{0.5}$Co$_{0.5}$OOH. The mixed oxyhydroxide was then taken up in suspension in a 5M LiOH solution at 90° C. for 72 hours. The result was washed with deionized water and dried at 70° C. The substance obtained was a lithium-containing nickel oxide of formula Li$_x$Ni$_{0.5}$Co$_{0.5}$O$_2$. Spectroscopic analysis showed that x was equal to 1; the mean diameter of the substance obtained, as measured by laser granulometry, was 0.3 μm.

4ii) "Test" electrodes "d" were made with the above powder as in example 1ii) using a paste whose composition expressed as a percentage by weight relative to the weight of the paste was approximately as follows:

lithium-containing nickel and cobalt oxide powder: 45%,
water: 53.2%,
CMC: 0.3%,
PTFE: 1.5%.

4iii) Storage cells including the electrodes "d" were assembled as in example 1iii). Storage cells Ad were obtained.

EXAMPLE 5

5i) Nickel hydroxide powder containing 10% cobalt hydroxide was prepared by the method described in example 1i) using a mixture of a solution of 0.1M cobalt sulfate and 0.9M nickel sulfate. A mixed hydroxide was obtained of formula Ni$_{0.9}$Co$_{0.1}$(OH)$_2$. The mixed hydroxide was taken up in suspension in a solution containing excess 48° sodium hypochlorite solution for 2 hours at 20° C. The result was washed with deionized water and dried at 70° C. The substance obtained was a mixed oxyhydroxide of formula $Ni_{0.9}Co_{0.1}OOH$. The mixed oxyhydroxide was then taken up in suspension in a 5M LiOH solution at 90° C. for 72 hours. The result was washed with deionized water and dried at 70° C. The substance obtained was a lithium-containing nickel oxide of formula $Li_xNi_{0.9}Co_{0.1}O_2$. Spectroscopic analysis showed that x was equal to 0.98; the diameter of the substance obtained, as measured by laser granulometry, was 0.35 µm.

5ii) "Test" electrodes "e" were made with the above powder as in example 1ii) using a paste whose composition expressed as a percentage by weight relative to the weight of the paste was approximately as follows:

lithium-containing nickel and cobalt oxide powder: 45%,
water: 53.2%,
CMC: 0.3%,
PTFE: 1.5%.

5iii) Storage cells including the electrodes "e" were assembled as in example 1iii). Storage cells Ae were obtained.

EXAMPLE 6 (comparative)

6i) Nickel hydroxide powder was prepared by the method described in example 1i) using a 1M nickel sulfate solution. A hydroxide was obtained of formula $Ni(OH)_2$. The hydroxide was taken up in suspension in a solution containing excess 48° sodium hypochlorite solution for 2 hours at 20° C. The result was washed with deionized water and dried at 70° C. The substance obtained was an oxyhydroxide of formula NiOOH. The oxyhydroxide was then taken up in suspension in a 5M LiOH solution at 90° C. for 72 hours. The result was washed with deionized water and dried at 70° C. The substance obtained was a lithium-containing nickel oxide of formula $Li_xNiO_2$. Spectroscopic analysis showed that x was equal to 0.95; the diameter of the substance obtained, as measured by laser granulometry, was 0.25 µm.

6ii) "Test" electrodes "f" were made with the above powder as in example 1ii) using a paste whose composition expressed as a percentage by weight relative to the weight of the paste was approximately as follows:

lithium-containing nickel oxide powder: 45%,
water: 53.2%,
CMC: 0.3%,
PTFE: 1.5%.

6iii) Storage cells including the electrodes "f" were assembled as in example 1iii). Storage cells Af were obtained.

EXAMPLE 7 (comparative)

7i) Cobalt hydroxide powder was prepared by the method described in example 1i) using a 1M cobalt sulfate solution. A hydroxide was obtained of formula $Co(OH)_2$. The hydroxide was taken up in suspension in a solution containing excess 48° sodium hypochlorite solution for 2 hours at 20° C. The result was washed with deionized water and dried at 70° C. The substance obtained was an oxyhydroxide of formula CoOOH. The oxyhydroxide was then taken up in suspension in a 5M LiOH solution at 90° C. for 72 hours. The result was washed with deionized water and dried at 70° C. The substance obtained was a lithium-containing cobalt oxide of formula $Li_xCoO_2$. Spectroscopic analysis showed that x was equal to 1; the diameter of the substance obtained, as measured by laser granulometry, was 0.3 µm.

7ii) "Test" electrodes "g" were made with the above powder as in example 1ii) using a paste whose composition expressed as a percentage by weight relative to the weight of the paste was approximately as follows:

lithium-containing cobalt oxide powder: 45%,
water: 53.2%,
CMC: 0.3%,
PTFE: 1.5%.

7iii) Storage cells including the electrodes "g" were assembled as in example 1iii). Storage cells Ag were obtained.

EXAMPLE 8

8i) Nickel hydroxide powder containing 50% cobalt hydroxide was prepared by the method described in example 1i) using a mixture of a solution of 0.5M cobalt sulfate and 0.5M nickel sulfate. A mixed hydroxide was obtained of formula $Ni_{0.5}Co_{0.5}(OH)_2$. The mixed hydroxide was taken up in suspension in a solution containing excess 48° sodium hypochlorite solution mixed with 1M sodium hydroxide NaOH in a ratio of 1:1 for 2 hours at 20° C. The result was washed with deionized water and dried at 70° C. The substance obtained was a mixed oxyhydroxide of formula $Ni_{0.5}Co_{0.5}OOH$ containing sodium cations. The mixed oxyhydroxide was then taken up in suspension in a 5M LiOH solution at 90° C. for 72 hours. The result was washed with deionized water and dried at 70° C. The substance obtained was a lithium-containing oxide of formula $Li_xNa_yNi_{0.5}Co_{0.5}O_2$. Spectroscopic analysis showed that x was equal to 0.97; the diameter of the substance obtained, as measured by laser granulometry, was 0.4 µm.

8ii) "Test" electrodes "h" were made as in example 1ii) using a paste whose composition expressed as a percentage by weight relative to the weight of the paste was approximately as follows:

lithium-containing oxide powder: 45%,
water: 53.2%,
CMC: 0.3%,
PTFE: 1.5%.

8iii) Storage cells including the electrodes "h" were assembled as in example 1iii). Storage cells Ah were obtained.

To characterize the shelf life of the various conductive structures, the storage cells Aa through Ah were tested under the following conditions after a rest period of 48 hours:

Cycle 1:

Charge at 0.025 Ic for 60 hours, where Ic is the current needed to discharge the nominal capacity of a storage cell in 1 hour;

Discharge at 0.1 Ic to a voltage of 0.6 volt;

Cycles 2 through 10:

Charge at 0.02 Ic for 60 hours at 20° C.;

Discharge at 0.2 Ic to a voltage of 0.6 volt.

One storage cell from each series was dismantled. The electronic conductivity and the degree of oxidation of the powder substance of the positive electrodes were measured.

The remaining storage cells were stored for 6 months in a discharged state at room temperature.

One storage cell per series was dismantled. The degree of oxidation of the powder material of the positive electrodes were measured. The results obtained are set out in Table 1.

TABLE 1

| Cell | Initial substances | Degree of oxidation before storage | Conductivity before storage S · Cm$^{-1}$ | Degree of oxidation after storage |
|---|---|---|---|---|
| Aa | Co(OH)$_2$ | 3.05 | 6 10$^{-2}$ | 2.3 |
| Ab | CoO | 3.12 | 4 10$^{-1}$ | 2.3 |
| Ac | Li$_x$Ni$_{0.02}$Co$_{0.98}$O$_2$ | 3.51 | 6 10$^{-1}$ | 3.31 |
| Ad | Li$_x$Ni$_{0.5}$Co$_{0.5}$O$_2$ | 3.53 | 5 10$^{-1}$ | 3.35 |
| Ae | Li$_x$Ni$_{0.9}$Co$_{0.1}$O$_2$ | 3.48 | 3 10$^{-1}$ | 3.42 |
| Af | Li$_x$NiO$_2$ | 3.50 | 3 10$^{-3}$ | 3.45 |
| Ag | Li$_x$CoO$_2$ | 3.52 | 6 10$^{-1}$ | 3.00 |
| Ah | Li$_x$Na$_y$Ni$_{0.5}$Co$_{0.5}$O$_2$ | 3.55 | 8 10$^{-1}$ | 3.35 |

The above results showed that the substances Co(OH)$_2$ and CoO were not stable during storage and suffered from reduction that was harmful to the conductive structure.

In contrast, the degree of oxidation of the lithium-containing nickel and cobalt oxide conductive substance of storage cells Ac, Ad, Ae and Ah in accordance with the invention changed little during the storage period.

When the quantity of nickel in the lithium-containing oxide was greater than 0.9, the conductivity of the material was 100 times lower.

When the quantity of nickel in the lithium-containing oxide was less than 0.02, the degree of oxidation of the material after storage was much lower than in the case of the other lithium-containing oxides, which means that the material was less stable in storage.

The quantity of nickel the lithium-containing nickel and cobalt oxides represented by the formula Li$_x$Ni$_y$Co$_{1-y}$O$_2$, was therefore preferably in the range from 0.02 to 0.9.

In a second series of tests the lithium-containing nickel and cobalt oxides of the invention and comparative conductive materials were tested as conductive additives in the form of powders in positive electrodes of sealed nickel-metal hydride Ni—MH storage cells.

EXAMPLE 9 (comparative)

Standard nickel electrodes "i" were made using a paste whose composition expressed as a percentage by weight relative to the weight of the paste was approximately as follows:

hydroxide powder with a mean diameter of 12 μm, consisting mainly of nickel hydroxide Ni(OH)$_2$, containing approximately 3.5% syncrystallized cobalt hydroxide and approximately 5% syncrystallized zinc hydroxide: 66%, cobalt hydroxide Co(OH)$_2$: 7.2%, water: 25%,

CMC: 0.3%,

PTFE: 1.5%.

The resulting paste was introduced into nickel foam having a porosity of approximately 95%. The result was dried and then rolled to obtain the electrodes "i".

Sealed nickel-metal hydride Ni—MH storage cells including the electrodes "i" were assembled. Each positive electrode was placed in contact with a hydridable alloy supercapacitive negative electrode of a type well-known in the art. The positive and negative electrodes were separated by a layer of non-woven-polypropylene and wound into a spiral. The assembly was then inserted into a metal container and impregnated with an alkaline electrolyte in the form of an aqueous solution of 7.4N potassium hydroxide KOH, 0.5N lithium hydroxide LiOH and 0.4N sodium hydroxide NaOH. Storage cells Bi were obtained.

EXAMPLE 10 (comparative)

Standard nickel electrodes "j" were made using a paste whose composition expressed as a percentage by weight relative to the weight of the paste was approximately as follows:

hydroxide powder with a mean diameter of 12 μm, consisting mainly of nickel hydroxide Ni(OH)$_2$, containing approximately 3.5% syncrystallized cobalt hydroxide and approximately 5% syncrystallized zinc hydroxide: 66%, cobalt oxide CoO: 6%, water: 26.2%,

CMC: 0.3%,

PTFE: 1.5%.

The resulting paste was introduced into nickel foam having a porosity of approximately 95%. The result was dried and then rolled to obtain the electrodes "j".

Sealed nickel-metal hydride Ni—MH storage cells including the electrodes "j" were assembled as in example 9. Storage cells Bj were obtained.

EXAMPLE 11

The substance LiNi$_{0.5}$Co$_{0.5}$O$_2$ obtained in example 4i) was used.

Nickel electrodes "k" were made using a paste whose composition expressed as a percentage by weight relative to the weight of the paste was approximately as follows:

hydroxide powder with a mean diameter of 12 μm, consisting mainly of nickel, containing approximately 3.5% syncrystallized cobalt hydroxide and approximately 5% syncrystallized zinc hydroxide: 66%, lithium-containing nickel and cobalt oxide LiNi$_{0.5}$Co$_{0.5}$O$_2$: 7.2%, water: 25%,

CMC: 0.3%,

PTFE: 1.5%.

The quantity of lithium-containing nickel oxide was therefore 10.9% relative to the nickel hydroxide.

The resulting paste was introduced into nickel foam having a porosity of approximately 95%. The result was dried and then rolled to obtain the electrodes "k".

Sealed nickel-metal hydride Ni—MH storage cells including the electrodes "k" were assembled as in example 9. Storage cells Bk were obtained.

EXAMPLE 12

Nickel electrodes "l", "m", "n", "o" were made using a paste whose composition expressed as a percentage by weight relative to the weight of the paste was approximately as follows:

lithium-containing nickel oxide LiNi$_{0.5}$Co$_{0.5}$O$_2$ obtained as in example 11, in the amount of:
  2.6% for the electrodes "l";
  4.0% for the electrodes "m";
  7.9% for the electrodes "n";
  10% for the electrodes "o";

a hydroxide powder having a mean diameter of 12 μm consisting mainly of nickel hydroxide Ni(OH)$_2$ containing approximately 3.5% syncrystallized cobalt hydroxide and approximately 5% syncrystallized zinc hydroxide: 73.2% less the quantity of lithium-containing nickel oxide, water: 25%,

CMC: 0.3%,
PTFE: 1.5%.

The quantities of lithium-containing nickel oxide were therefore respectively 3.9%, 6.1%, 12.0%, 15.2% for the electrodes "l", "m", "n", "o", as in example 9. Storage cells Bl, Bm, Bn, Bo were obtained.

EXAMPLE 13

Nickel hydroxide powder containing 50% cobalt hydroxide was prepared using a mixture of a solution of 0.5M cobalt sulfate and 0.5M nickel sulfate, as in the method examples 1i) and 4i), except that the synthesis temperature was 90° C. The substance obtained was lithium-containing nickel oxide of formula $Li_xNi_{0.5}Co_{0.5}O_2$ with a mean diameter, as measured by laser granulometry, equal to 0.6 μm. Spectroscopic analysis showed that the quantity of lithium x in the substance was equal to 1.

Nickel electrodes "i" were made using a paste whose composition expressed as a percentage by weight relative to the weight of the paste was approximately as follows:

hydroxide powder with a mean diameter of 12 μm, consisting mainly of nickel $Ni(OH)_2$, containing approximately 3.5% syncrystallized cobalt hydroxide and approximately 5% syncrystallized zinc hydroxide: 66%, lithium-containing nickel oxide $LiNi_{0.5}Co_{0.5}O_2$: 7.2%, water: 25%,

CMC: 0.3%,

PTFE: 1.5%.

The quantity of lithium-containing nickel oxide relative to the nickel hydroxide was therefore 10.9%.

The resulting paste was introduced into nickel foam having a porosity of approximately 95%. The result was dried and then rolled to obtain the electrodes "g".

Sealed nickel-metal hydride Ni—MH storage cells including the electrodes "g" were assembled as in example 9. Storage cells Bq were obtained.

To characterize the shelf life of the various conductive structures, the storage cells were tested under the following conditions:

Cycle 1:
 Charge at 0.1 Ic for 16 hours at 20° C., where Ic is the current needed to discharge the nominal capacity of a storage cell in 1 hour;
 Discharge at 0.2 Ic to a voltage of 1 volt;
 Cycles 2 and 3:
 Charge at Ic for 1.2 hours at 20° C.;
 Discharge at Ic to a voltage of 1 volt.

The storage cells were then stored at room temperature in the discharged state. After approximately two months, it was found that the voltage of the storage cells had fallen below the stable voltage of the cobalt oxyhydroxide (1.05 V).

After 6 months in storage, the remaining capacity was measured under the following conditions:

Cycles 4 to 9:

Charge at Ic for 1.2 hours at 20° C.;

Discharge at Ic to 1 volt.

The capacities per unit mass relative to the weight of the mixture of nickel-based hydroxide and lithium-containing oxide based conductive substances are set out in Table 2.

TABLE 2

| SERIES | Bi | Bj | Bk | Bl | Bm | Bn | Bo | Bq |
|---|---|---|---|---|---|---|---|---|
| Initial substances | $Co(OH)_2$ | CoO | | | $Li_xNi_{0.5}Co_{0.5}O_2$ | | | |
| Mean particle size | | | 0.3 μm | 0.3 μm | 0.3 μm | 0.3 μm | 0.3 μm | 0.6 μm |
| Weight % | | | 10.9% | 3.9% | 6.1% | 12% | 15.2% | 10.9% |
| Yield of electrode in cycle 3 (mAh/g) | 225 | 240 | 241 | 221 | 236 | 240 | 230 | 230 |
| Yield of electrode in cycle 9 (mAh/g) | 193 | 192 | 240 | 221 | 236 | 240 | 229 | 228 |

These results showed that the standard storage cells Bi and Bj suffered high losses of capacity in storage. There was practically no loss of capacity in storage for storage cells Bk through Bq.

In the case of the storage cell Bl, the quantity of conductive substance in accordance with the invention added to the electrode was too low, the electrode was not sufficiently conductive and the yield of the electrode was low.

Also, in the case of the storage cell Bo, the quantity of conductive substance in accordance with the invention added to the electrode was too high and the yield of the active material alone was not increased. For this reason, the yield of the electrode fell. The quantity of lithium-containing nickel-cobalt oxide added in the form of powder was therefore preferably in the range from 6% to 12% by weight relative to the active material.

The results for the cells Bq showed that, although the quantity of lithium-containing oxide was sufficient, the particle size range of the substance was too high and ruled out obtaining an optimum yield from the material. The lithium-containing nickel and cobalt oxides must preferably be made up of particles with a mean diameter less than 0.5 μm.

In a third series of tests, the lithium-containing nickel and cobalt oxides in accordance with the invention and comparative conductive materials were tested as conductive additives in the form of a coating of the nickel-hydroxide grains in positive electrodes of Ni—MH storage cells.

EXAMPLE 14 (comparative)

Nickel hydroxide powder with the grains coated with cobalt hydroxide was made under the following conditions.

Nickel hydroxide powder consisting mainly of nickel, containing approximately 3.5% syncrystallized cobalt hydroxide and approximately 5% syncrystallized zinc hydroxide was taken up in suspension in a 4M solution of cobalt sulfate at 70° C. Sodium hydroxide solution was added slowly to maintain the pH of the solution in the range from 9 to 11. The resulting powder was then washed and dried. Nickel hydroxide powder coated with cobalt hydroxide was obtained. The quantity of cobalt hydroxide deposited on the nickel hydroxide powder was 6%.

Nickel electrodes "r" were made using a paste whose composition expressed as a percentage by weight relative to the weight of the paste was approximately as follows:

nickel hydroxide powder coated with cobalt hydroxide: 73.2%,
water: 25%,
CMC: 0.3%,
PTFE: 1.5%.

The resulting paste was introduced into nickel foam having a porosity of approximately 95%. The result was dried and then rolled to obtain the electrodes "r".

Sealed nickel-metal hydride Ni—MH storage cells including the electrodes "r" were assembled as in example 9. Storage cells Br were obtained.

EXAMPLE 15

Nickel hydroxide powder with the grains coated with lithium-containing nickel and cobalt oxide of formula $Li_xNi_{0.05}Co_{0.95}O_2$ was made under the following conditions.

Nickel hydroxide powder consisting mainly of nickel, containing approximately 3.5% syncrystallized cobalt hydroxide and approximately 5% syncrystallized zinc hydroxide was taken up in suspension in a solution of 4M cobalt sulfate and 0.2M nickel sulfate at 70° C. Sodium hydroxide solution was added slowly to maintain the pH of the solution in the range from 9 to 11. The resulting powder was then washed and dried. Nickel hydroxide powder coated with nickel hydroxide of composition $Ni_{0.05}Co_{0.95}(OH)_2$ was obtained. Said powder was then taken up in a 5N solution of lithium hydroxide LiOH at 90° C. for 24 hours in the presence of oxygen. Said powder was then washed and dried. Nickel hydroxide powder coated with lithium-containing nickel oxide of formula $Li_xNi_{0.05}Co_{0.95}O_2$ was obtained. Spectroscopic analysis showed that x was equal to 0.95; the diameter of the substance obtained, as measured by laser granulometry, was 0.3 μm. The quantity of lithium-containing nickel oxide deposited on the nickel hydroxide powder was 6%.

Nickel electrodes "s" were made using a paste whose composition expressed as a percentage by weight relative to the weight of the paste was approximately as follows:

nickel hydroxide powder coated with lithium-containing nickel and cobalt oxide: 73.2%,
water: 25%,
CMC: 0.3%,
PTFE: 1.5%.

The resulting paste was introduced into nickel foam having a porosity of approximately 95%. The result was dried and then rolled to obtain the electrodes "s".

Sealed nickel-metal hydride Ni—MH storage cells including the electrodes "s" were assembled as in example 9. Storage cells Bs were obtained.

EXAMPLE 16

Nickel hydroxide powders Pt, Pu, Pv, Pw with the grains coated with lithium-containing nickel oxide were made under conditions identical to those of example 15. The quantities of cobalt sulfate were adjusted so that the quantity of lithium-containing nickel oxide deposited on the nickel hydroxide powder was 1.5%, 3.5%, 8.5%, 15% for the powders Pt, Pu, Pv, Pw, respectively.

Nickel electrodes "t", "u", "v", "w" were made using a paste whose composition expressed as a percentage by weight relative to the weight of the paste was approximately as follows:

nickel hydroxide powder coated with lithium-containing cobalt and nickel oxide: 73.2%,
water: 25%,
CMC: 0.3%,
PTFE: 1.5%.

Sealed nickel-metal hydride Ni—MH storage cells including the electrodes "t", "u", "v", "w" were assembled as in example 9. Storage cells Bt, Bu, Bv, Bw were obtained.

To characterize the shelf life of the various conductor structures, the storage cells were tested under the following conditions:

Cycle 1:
Charge at 0.1 Ic for 16 hours at 20° C., where Ic is the current needed to discharge the nominal capacity of a storage cell in 1 hour;
Discharge at 0.2 Ic to a voltage of 1 volt;

Cycles 2 and 3:
Charge at Ic for 1.2 hours at 20° C.;
Discharge at Ic to a voltage of 1 volt.

The storage cells were then stored at room temperature in the discharged state. After approximately two months, it was found that the voltage of the storage cells had fallen below the stable voltage of the cobalt oxyhydroxide (1.05 V).

After 6 months in storage, the remaining capacity was measured under the following conditions:

Cycles 4 to 9:
Charge at Ic for 1.2 hours at 20° C.;
Discharge at Ic to 1 volt.

The capacities per unit mass relative to the weight of the mixture of nickel-based hydroxide and cobalt-based conductive substances are set out in Table 3.

TABLE 3

| SERIES | Br | Bs | Bt | Bu | Bv | Bw |
|---|---|---|---|---|---|---|
| Initial substances | Co(OH)$_2$ | 6% | $Li_xNi_{0.05}Co_{0.95}O_2$ 1.5% | 3.5% | 8.5% | 15% |
| Yield of electrode in cycle 3 (mAh/g) | 252 | 251 | 210 | 248 | 252 | 235 |
| Yield of electrode in cycle 9 (mAh/g) | 185 | 250 | 211 | 246 | 252 | 235 |

The storage cells Br which were not in accordance with the invention suffered high capacity losses in storage.

There was practically no loss of capacity in storage for the storage cells Bs through Bw. In the case of storage cells Bt, the quantity of conductive substance covering the nickel hydroxide was too small, the electrode was insufficiently conductive and the yield of the electrode was low. In the case of storage cells Bw, the quantity of conductive substance covering the nickel hydroxide was too great and the yield of the active material alone was not increased. Because of this the yield of the electrode was low. When the substance was added in the form of a coating to the nickel hydroxide powder, the quantity of lithium-containing nickel and cobalt oxide relative to the active material was therefore preferably in the range from 3% to 9% by weight.

Finally, in another embodiment of the invention, the lithium-containing nickel and cobalt oxide can be used in accordance with the invention in the positive electrode in the form of a mixture of lithium-containing oxide powder and nickel hydroxide powder whose grains are coated-with lithium-containing oxide.

Of course, the invention is not limited to the embodiments that have just been described.

What is claimed is:

1. A non-sintered nickel electrode for alkaline electrolyte storage cells including a current collector and a paste containing an active material based on nickel hydroxide and a conductive material, wherein said conductive material is a lithium-containing oxide, wherein the lithium-containing oxide is a lithium-containing cobalt and a nickel oxide whose degree of oxidation obtained after electrochemical conditioning is stable after prolonged storage in the alkaline electrolyte.

2. A nickel electrode according to claim 1, wherein the conductivity of said conductive material after electrochemical conditioning is greater than $10^{-2}$ Siemens.cm$^{-1}$.

3. A nickel electrode according to claim 1, wherein said lithium-containing oxide has the formula $Li_xNi_yCo_{1-y}O_2$ with x in the range from 0.1 to 1 and y in the range from 0.02 to 0.9.

4. A nickel electrode according to claim 1, wherein said lithium-containing oxide is in the form of powder mixed with nickel hydroxide powder.

5. A nickel electrode according to claim 1, wherein said lithium-containing oxide coats nickel hydroxide grains.

6. A nickel electrode according to claim 1, wherein said lithium-containing oxide is both in the form of powder mixed with nickel hydroxide powder and in the form of a coating on nickel hydroxide grains.

7. A nickel electrode according to claim 1, wherein grains of lithium-containing oxide powder have a mean particle size less than 0.7 µm.

8. A nickel electrode according to claim 1, wherein the quantity of said lithium-containing oxide in the form of powder relative to said active material is in the range from 6% to 12% by weight.

9. A nickel electrode according to claim 1, wherein the quantity of said lithium-containing oxide in the form of coating on nickel hydroxide powder grains relative to said active material is in the range from 3% to 9% by weight.

10. A nickel electrode according to claim 1, wherein said lithium-containing oxide contains sodium.

11. A nickel electrode according to claim 8, wherein said lithium-containing oxide has the formula $Li_xNa_zNi_yCo_{1-y}O_2$ with x+z in the range from 0.1 to 1 and z in the range from 0 to 0.5.

12. A nickel electrode according to claim 1, wherein said nickel hydroxide contains nickel and at least one syncrystallized hydroxide of an element selected from the group consisting of zinc, cadmium, magnesium and aluminum.

13. A nickel electrode according to claim 12, wherein said nickel hydroxide further includes at least one syncrystallized hydroxide of an element selected from the group consisting of cobalt, manganese, yttrium, calcium and zirconium.

14. An electrode according to claim 1, wherein said current collector is nickel foam.

15. An electrode according to claim 1, wherein said paste further includes a first binder based on polytetrafluoroethylene (PTFE) and a second binder selected from the group consisting of carboxy-methyl cellulose (CMC), hydroxypropylmethyl cellulose (HPMC), hydroxyethyl cellulose (HEC), hydroxypropyl cellulose (HPC), polyvinylidene fluoride (PVDF) and styrene butadiene rubber (SBR).

* * * * *